(12) United States Patent
Sun et al.

(10) Patent No.: US 8,871,312 B2
(45) Date of Patent: Oct. 28, 2014

(54) METHOD OF REDUCING PLASMA ARCING ON SURFACES OF SEMICONDUCTOR PROCESSING APPARATUS COMPONENTS IN A PLASMA PROCESSING CHAMBER

(75) Inventors: Jennifer Y. Sun, Sunnyvale, CA (US);
Kenneth S. Collins, San Jose, CA (US);
Ren-Guan Duan, San Jose, CA (US);
Senh Thach, Union City, CA (US);
Thomas Graves, Los Altos, CA (US);
Xiaoming He, Arcadia, CA (US); Jie Yuan, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 13/573,354

(22) Filed: Sep. 10, 2012

(65) Prior Publication Data

US 2013/0022838 A1  Jan. 24, 2013

Related U.S. Application Data

(62) Division of application No. 11/890,156, filed on Aug. 2, 2007.

(51) Int. Cl.
| | | |
|---|---|---|
| *C04B 35/505* | (2006.01) | |
| *B32B 18/00* | (2006.01) | |
| *C04B 35/50* | (2006.01) | |
| *C04B 35/486* | (2006.01) | |
| *C04B 35/495* | (2006.01) | |

(52) U.S. Cl.
CPC ....... *C04B 35/505* (2013.01); *C04B 2235/3244* (2013.01); *C04B 35/50* (2013.01); *C04B 2235/762* (2013.01); *C04B 2235/404* (2013.01); *C04B 2235/3225* (2013.01); *C04B 2235/80* (2013.01); *C04B 2235/3222* (2013.01); *C04B 2235/81* (2013.01); *C04B 2235/3251* (2013.01); *C04B 2235/77* (2013.01); *C04B 2235/3217* (2013.01); *C04B 2235/3229* (2013.01); *C04B 2235/3255* (2013.01); *C04B 35/486* (2013.01); *C04B 2235/3224* (2013.01); *C04B 35/495* (2013.01)
USPC ........... 427/569; 427/180; 427/226; 501/105; 501/127; 501/152

(58) Field of Classification Search
None
See application file for complete search history.

(56) References Cited

U.S. PATENT DOCUMENTS

| 4,507,394 A | * | 3/1985 | Mase et al. ...................... 501/94 |
|---|---|---|---|
| 5,366,585 A | | 11/1994 | Robertson et al. ............ 156/643 |

(Continued)

FOREIGN PATENT DOCUMENTS

| DE | 19955134 | 5/2001 | .............. F23D 14/66 |
|---|---|---|---|
| EP | 0293198 A2 | 11/1988 | .............. C23C 30/00 |

(Continued)

OTHER PUBLICATIONS

Jorgensen, P.J. and Anderson, R.C. "Grain-Boundary Segregation and Final-Stage Sintering of $Y_2O_3$" Journal of the American Ceramic Society. pp. 553-558. Nov. 21, 1967.

(Continued)

*Primary Examiner* — Joseph Miller, Jr.
(74) *Attorney, Agent, or Firm* — Shirley L. Church, Esq.

(57) ABSTRACT

Specialty ceramic materials which resist corrosion/erosion under semiconductor processing conditions which employ a corrosive/erosive plasma. The corrosive plasma may be a halogen-containing plasma. The specialty ceramic materials have been modified to provide a controlled electrical resistivity which suppresses plasma arcing potential.

5 Claims, 5 Drawing Sheets

(56) References Cited

U.S. PATENT DOCUMENTS

| | | | |
|---|---|---|---|
| 5,488,925 A | 2/1996 | Kumada | 118/715 |
| 5,605,637 A | 2/1997 | Shan et al. | 216/71 |
| 5,680,013 A | 10/1997 | Dornfest et al. | 315/111.21 |
| 5,798,016 A | 8/1998 | Oehrlein et al. | 156/345 |
| 5,902,763 A | 5/1999 | Waku et al. | 501/127 |
| 6,123,791 A | 9/2000 | Han et al. | 156/1 |
| 6,170,429 B1 | 1/2001 | Schoepp et al. | 118/723 R |
| 6,352,611 B1 | 3/2002 | Han et al. | 156/345 |
| 6,383,964 B1 | 5/2002 | Nakahara et al. | 501/152 |
| 6,408,786 B1 | 6/2002 | Kennedy et al. | 118/723 AN |
| 6,429,400 B1 | 8/2002 | Sawada et al. | 219/121.52 |
| 6,447,937 B1 | 9/2002 | Murakawa et al. | 428/696 |
| 6,492,042 B2 | 12/2002 | Morita et al. | 428/697 |
| 6,521,046 B2 | 2/2003 | Tanaka et al. | 118/715 |
| 6,547,978 B2 | 4/2003 | Ye et al. | 216/75 |
| 6,565,984 B1 | 5/2003 | Wu et al. | 428/472.2 |
| 6,592,707 B2 | 7/2003 | Shih et al. | 156/345.1 |
| 6,641,697 B2 | 11/2003 | Han et al. | 156/345 |
| 6,645,585 B2 | 11/2003 | Ozono | 428/34 |
| 6,682,627 B2 | 1/2004 | Shamouilian et al. | 156/345 |
| 6,773,751 B2 | 8/2004 | O'Donnell et al. | 427/255.38 |
| 6,776,873 B1 | 8/2004 | Sun et al. | 156/345.41 |
| 6,780,787 B2 | 8/2004 | O'Donnell | 438/758 |
| 6,783,863 B2 | 8/2004 | Harada et al. | 428/469 |
| 6,830,622 B2 | 12/2004 | O'Donnell | 118/715 |
| 6,884,516 B2 | 4/2005 | Harada et al. | 428/469 |
| 6,916,559 B2 | 7/2005 | Murakawa et al. | 428/697 |
| 6,933,254 B2 | 8/2005 | Morita et al. | 501/103 |
| 6,942,929 B2 | 9/2005 | Han et al. | 428/650 |
| 6,983,892 B2 | 1/2006 | Noorbakhsh et al. | 239/67 |
| 7,137,353 B2 | 11/2006 | Saigusa et al. | 118/715 |
| 7,147,749 B2 | 12/2006 | Nishimoto et al. | 156/345 |
| 7,163,585 B2 | 1/2007 | Nishimoto et al. | 118/715 |
| 7,166,166 B2 | 1/2007 | Saigusa et al. | 118/715 |
| 7,166,200 B2 | 1/2007 | Saigusa et al. | 204/298 |
| 7,220,497 B2 | 5/2007 | Chang | 428/701 |
| 7,648,782 B2 | 1/2010 | Kobayashi et al. | 428/701 |
| 7,696,117 B2 | 4/2010 | Sun et al. | 501/134 |
| 8,034,734 B2 | 10/2011 | Sun et al. | 501/152 |
| 2001/0003271 A1 | 6/2001 | Otsuki | 118/723 |
| 2002/0009560 A1 | 1/2002 | Ozono | 428/34 |
| 2002/0018921 A1 | 2/2002 | Yamada et al. | 428/697 |
| 2002/0110698 A1 | 8/2002 | Singh | 428/472 |
| 2003/0027013 A1 | 2/2003 | Schaeffer et al. | 428/632 |
| 2003/0215643 A1 | 11/2003 | Morita et al. | 428/409 |
| 2004/0060657 A1 | 4/2004 | Saigusa et al. | 156/345 |
| 2004/0149210 A1 | 8/2004 | Fink | 118/715 |
| 2004/0191545 A1 | 9/2004 | Han et al. | 428/472 |
| 2004/0245098 A1 | 12/2004 | Eckerson | 204/298 |
| 2005/0037193 A1 | 2/2005 | Sun et al. | 428/332 |
| 2005/0056218 A1 | 3/2005 | Sun et al. | 118/715 |
| 2005/0065012 A1 | 3/2005 | Rosenflanz et al. | 501/41 |
| 2005/0123288 A1 | 6/2005 | Ito et al. | 392/418 |
| 2005/0227118 A1 | 10/2005 | Uchimaru et al. | 428/702 |
| 2005/0274320 A1 | 12/2005 | Murugesh et al. | 118/715 |
| 2005/0279457 A1 | 12/2005 | Matsudo et al. | 156/345 |
| 2006/0037536 A1 | 2/2006 | Kobayashi et al. | 118/715 |
| 2006/0040508 A1 | 2/2006 | Ji et al. | 438/758 |
| 2006/0042754 A1 | 3/2006 | Yoshida et al. | 156/345 |
| 2006/0043067 A1 | 3/2006 | Kadkhodayan et al. | 216/67 |
| 2006/0073354 A1 | 4/2006 | Watanabe et al. | 428/596 |
| 2007/0105708 A1 | 5/2007 | Fujita et al. | 501/152 |

FOREIGN PATENT DOCUMENTS

| | | | |
|---|---|---|---|
| EP | 1988187 A2 | 11/2008 | C23C 16/44 |
| GB | 2163970 A | 3/1986 | B05D 3/02 |
| JP | S61031352 | 2/1986 | C04B 35/48 |
| JP | 03287797 A | 12/1991 | C25D 11/18 |
| JP | H11251304 | 9/1999 | H01L 21/3065 |
| JP | 2000001362 | 1/2000 | C04B 35/00 |
| JP | 2000012666 | 1/2000 | H01K 21/68 |
| JP | 2001023908 | 1/2001 | H01L 21/205 |
| JP | 2001089229 | 4/2001 | C04B 35/46 |
| JP | 2001181042 | 7/2001 | C04B 35/50 |
| JP | 2001203256 | 7/2001 | H01L 21/68 |
| JP | 2001244246 | 9/2001 | H01L 21/3065 |
| JP | 2001322871 | 11/2001 | C04B 35/50 |
| JP | 2002080270 | 3/2002 | C04B 35/00 |
| JP | 2003282688 | 10/2003 | H01L 21/68 |
| JP | 2004292270 | 10/2004 | C04B 35/50 |
| JP | 2005335991 | 12/2005 | C04B 35/50 |
| JP | 2007145702 | 6/2007 | C04B 35/50 |
| SU | 868881 B | 9/1981 | H01J 1/32 |
| WO | WO 2009017766 | 2/2009 | C23C 16/44 |

OTHER PUBLICATIONS

Lee, Jin-Ho, Yashima, Masatomo, Kakihana, Masato and Yoshimura, Masahiro "Phase Diagram and Oxygen-Ion Conductivity in the $Y_2O_3$-$Nb_2O_5$ System" Journal of the American Ceramic Society. pp. 894-900. Jun. 9, 1997.

Mah, Tai-Il and Petry, M. Dennis "Eutectic Composition in the Pseudobinary of $Y_4Al_2O_9$ and $Y_2O_3$" Journal of the American Ceramic Society. pp. 2006-2009. Jul. 1992.

C. Pascual, J.R. et al., "Electrical behavior of doped-yttria stabilized zirconia ceramic materials," *Journal of Materials Science 18.*, pp. 1315-1322 (1983).

Schieltz, J.D. and Wilder, D.R. "Anomalous Sintering Behavior of $Y_2O_3$" Journal of the American Ceramic Society. pp. 439-440. Aug. 1967.

Tanaka, Junzo "Nonlinear Electrical Properties of Grain Boundaries in an Oxygen-Ion Conductor ($CeO_2$-$Y_2O_3$)" Journal of the American Ceramic Society. pp. 637-643. Mar. 13, 1987.

Advanced Ceramic Processing and Technology. Edited by: Binner, J.G.P. © 1990. William Andrew Publishing/Noyes. Online version available http://www.knovel.com/knovel2/Toc.jsp?/BookID=175 &VerticalID=0 Chapter 5 "Processing of Ceramic Composites" Editor R. W. Rice. Source of Chapter 5 is W.R. Grace & Co., 7379 Route 32, Columbia MD 21044 pp. 123-213.

"Plasma Spray". SemiCon Precision Industries Inc. 2005. Jun. 16, 2007. http://www.semiconprecision.com/plasma.htm.

"Surface Preparation". SemiCon Precision Industries Inc. 2005. Jun. 16, 2007. http:www.semiconprecision.com/surface_prep.htm.

\* cited by examiner

METHOD OF REDUCING PLASMA ARCING ON SURFACES OF SEMICONDUCTOR PROCESSING APPARATUS COMPONENTS IN A PLASMA PROCESSING CHAMBER

This application is a divisional application of U.S. application Ser. No. 11/890,156, filed Aug. 2, 2007, and entitled: "Plasma-Resistant Ceramics With Controlled Electrical Resistivity", which is currently pending.

The present application is related to a series of applications which have common inventorship with the present application. All of the applications listed below relate to the use of a yttrium-oxide comprising ceramic to provide a plasma-resistant surface which is useful in semiconductor processing apparatus. The related applications include U.S. application Ser. No. 11/796,210, of Sun et al., filed Apr. 27, 2007, titled: "Method of Reducing The Erosion Rate Of Semiconductor Processing Apparatus Exposed To Halogen-Containing Plasmas", which is now abandoned; U.S. application Ser. No. 11/796,211, of Sun et al., filed Apr. 27, 2007, titled: "Method And Apparatus Which Reduce The Erosion Rate Of Surfaces Exposed To Halogen-Containing Plasmas", which issued as U.S. Pat. No. 7,696,117 on Apr. 13, 2010; U.S. application Ser. No. 10/898,113 of Sun et al., filed Jul. 22, 2004, titled: "Clean Dense Yttrium Oxide Coating Protecting Semiconductor Apparatus", which is currently pending; U.S. application Ser. No. 10/918,232 of Sun et al., filed Aug. 13, 2004, titled: "Gas Distribution Plate Fabricated From A Solid Yttrium Oxide-Comprising Substrate", which issued as U.S. Pat. No. 7,479,304 on Jan. 20, 2009; and U.S. application Ser. No. 10/075,967 of Sun et al., filed Feb. 14, 2002, titled: "Yttrium Oxide Based Surface Coating For Semiconductor IC Processing Vacuum Chambers", which issued as U.S. Pat. No. 6,776,873 on Aug. 17, 2004. Additional related applications filed, which are a divisional and a continuation application of above-listed applications, include: U.S. application Ser. No. 11/595,484 of Wang et al., filed Nov. 10, 2006, titled: "Cleaning Method Used In Removing Contaminants From The Surface Of An Oxide or Fluoride Comprising a Group III Metal", which is now abandoned, and which is a divisional application of U.S. application Ser. No. 10/898,113; and U.S. application Ser. No. 11/592,905 of Wang et al., filed Nov. 3, 2006, titled: "Cleaning Method Used In Removing Contaminants From A Solid Yttrium Oxide-Containing Substrate", which is currently pending, and which is a continuation application of U.S. application Ser. No. 10/918,232. The subject matter of all of these patents and applications is hereby incorporated by reference.

BACKGROUND

1. Field

Embodiments of the present invention relate to a specialized yttrium oxide-comprising ceramic which is mainly comprised of solid solution ceramic which is highly resistant to plasmas of the kind which are present in semiconductor processing apparatus.

2. Background Art

This section describes background subject matter related to the disclosed embodiments of the present invention. There is no intention, either express or implied, that the background art discussed in this section legally constitutes prior art.

Corrosion (including erosion) resistance is a critical property for apparatus components and liners used in semiconductor processing chambers, where corrosive environments are present. Although corrosive plasmas are present in the majority of semiconductor processing environments, including plasma enhanced chemical vapor deposition (PECVD) and physical vapor deposition (PVD), the most corrosive plasma environments are those used for cleaning of processing apparatus and those used to etch semiconductor substrates. This is especially true where high-energy plasma is present and combined with chemical reactivity to act upon the surface of components present in the environment. The reduced chemical reactivity of an apparatus component surface or of a process chamber liner surface is an important property when corrosive gases, even in the absence of a plasma, are in contact with processing apparatus surfaces.

Process chamber liners and component apparatus present within the processing chambers used to fabricate electronic devices and micro-electro-mechanical systems (MEMS) are frequently constructed from aluminum and aluminum alloys. Surfaces of the process chamber and component apparatus (present within the chamber) are frequently anodized to provide a degree of protection from the corrosive environment. However, the integrity of the anodization layer may be deteriorated by impurities in the aluminum or aluminum alloy, so that corrosion begins to occur early, shortening the life span of the protective coating. The plasma resistance properties of aluminum oxide are not positive in comparison with some other ceramic materials. As a result, ceramic coatings of various compositions have been used in place of the aluminum oxide layer mentioned above; and, in some instances, have been used over the surface of the anodized layer to improve the protection of the underlying aluminum-based materials.

Yttrium oxide is a ceramic material which has shown considerable promise in the protection of aluminum and aluminum alloy surfaces which are exposed to halogen-containing plasmas of the kind used in the fabrication of semiconductor devices. An yttrium oxide coating has been used and applied over an anodized surface of a high purity aluminum alloy process chamber surface, or a process component surface, to produce excellent corrosion protection (e.g. U.S. Pat. No. 6,777,873 to Sun et al., mentioned above). The protective coating may be applied using a method such as spray coating, physical vapor deposition (PVD) or chemical vapor deposition (CVD) by way of example.

A film of $Al_2O_3$, or $Al_2O_3$ and $Y_2O_3$ has been formed on an inner wall surface of a processing chamber and on those exposed surfaces of the members within the chamber which require a high corrosion resistance and insulating property. In an exemplary application, a base material of the chamber may be a ceramic material ($Al_2O_3$, $SiO_2$, AlN, etc.), aluminum, or stainless steel, or other metal or metal alloy, which has a sprayed film over the base material. The film may be made of a compound of a III-B element of the periodic table, such as $Y_2O_3$ The film may substantially comprise $Al_2O_3$ and $Y_2O_3$. A sprayed film of yttrium-aluminum-garnet (YAG) has also been mentioned. Examples of a sprayed film thickness range from 50 μm to 300 μm.

SUMMARY

Specialty sintered ceramic materials have been developed which resist corrosion under semiconductor processing conditions which employ a halogen-containing plasma. The specialty materials have been modified to have improved plasma resistance and tailored mechanical properties in comparison with the sintered ceramic materials previously used for semiconductor processing apparatus. The electrical properties of the sintered ceramic materials have been adjusted so that the electrical resistivity properties of the materials (which have an effect in a plasma processing chamber) meet the requirements of critical chamber components. These electrical resistivity property requirements were previously met only by materials which exhibited low plasma resistance properties. The present specialty materials (which offer various combinations of plasma resistance, mechanical properties, and electrical resistivity properties) are sufficiently similar to those of semiconductor processing apparatus previously used. One advantage of the similar electrical properties is that it is not necessary to change the process recipes or general processing conditions which are currently in use in semiconductor device fabrication.

The specialty sintered ceramic material used to fabricate semiconductor processing chamber components may be applied over an underlying material using thermal/flame spraying or plasma spraying, physical vapor deposition (such as sputtering from a target comprised of the specialty sintered ceramic material) or chemical vapor deposition, by way of example. In the alternative, the sintered ceramic material may be used to fabricate a solid component using a molding process, for example, when this is preferable to use of a coating.

The sintered ceramic materials of interest comprise yttrium oxide-based solid solutions. In one embodiment, the electrical resistivity of the sintered, yttrium oxide-comprising ceramic material is altered. In one exemplary embodiment technique, other oxides are added to the yttrium oxide, and the mixture is sintered. The positive ions of the other oxides have a different valence from the $Y^{3+}$ ion, to form a Y vacancy, leading to a decrease of electrical resistivity. Examples of such other oxides include $CeO_2$, $TiO_2$, $ZrO_2$, $HfO_2$, and $Nb_2O_5$, by way of example and not by way of limitation. In an alternative exemplary embodiment technique, other oxides are added to the yttrium oxide and the mixture is sintered. The positive ions of the other oxide show the same valence as the $Y^{3+}$ ion, but possess a significantly different ion radius than the $Y^{3+}$ ion. The precursor mixture is sintered in a reductive atmosphere. This results in an O vacancy, which also decreases electrical resistivity. Examples of oxides which show the same valence as the $Y^{3+}$ ion, but possess a significantly different ion radius include $Nd_2O_3$, $Sm_2O_3$, $Sc_2O_3$, $Yb_2O_3$, $Er_2O_3$, $Ho_2O_3$ and $Dy_2O_3$, by way of example and not by way of limitation.

One of the major components in a semiconductor processing chamber which requires a lower resistivity than is typical for yttrium-comprising sintered ceramics is the electrostatic chuck. The electrostatic chuck designers recommend that the resistivity of the dielectric surface of the electrostatic chuck fall within a range from about $10^9$ to $10^{11}$ $\Omega \cdot cm$ under semiconductor processing conditions, to reduce the possibility of plasma arcing at the electrostatic chuck. This resistivity range is equivalent to a conductivity within a range from about $10^{-9}$ to $10^{-7}$ S/m. This is a considerably lower resistivity than bulk $Si_3N_4$, for example, which exhibits a conductivity of $10^{-13}$ S/m. For other corrosion resistant surfaces where plasma arcing might be a problem, such as lift pins, a resistivity in the range of that required for an electrostatic chuck is helpful. For corrosion resistant surfaces such as process chamber liners, the resistivity may be higher, possibly as high as or exceeding about $10^{14}$ $\Omega \cdot cm$ and still be acceptable.

At least one solid solution forms the major molar % of sintered ceramic materials which are useful as electrically modified corrosion-resistant materials. When there are two oxides used to form a solid solution, these oxides typically comprise yttrium oxide in combination with another oxide, which is typically selected from the group consisting of zirconium oxide, cerium oxide, hafnium oxide, niobium oxide, and combinations thereof. Use of other oxides such as scandium oxide, neodymium oxide, samarium oxide, ytterbium oxide, erbium oxide, and cerium oxide (and other lanthanide series element oxides) is considered to be acceptable in some instances.

When there are more than two oxides used to form the one or more solid solutions, these oxides typically comprise yttrium oxide, zirconium oxide, and at least one other oxide, which is typically selected from the group consisting of hafnium oxide, scandium oxide, neodymium oxide, niobium oxide, samarium oxide, ytterbium oxide, erbium oxide, cerium oxide, and combinations thereof. The use of other lanthanide series elements is also possible in particular instances. When the sintered ceramics comprise multi solid solution phases, typically there are two phases or three phases. In addition to the at least one solid solution-phase, there may be other phases within the sintered ceramic which are compounds or elemental metals.

By way of example, and not by way or limitation, with respect to sintered ceramics which make use of two precursor oxides, experiments have confirmed that a sintered ceramic comprising a solid solution, where yttrium oxide is present over a range from about 40 molar % to less than 100 molar %, and zirconium oxide is present over a range from more than 0 molar % to about 60 molar %, produces a sintered ceramic having a resistivity which is in the range from about $10^7$ to about $10^{15}$ $\Omega \cdot cm$ at room temperature. Resistivity over the same range is expected to be obtained from a combination of precursor oxides where yttrium oxide is present over a range from more than 0 molar % to less than 100 molar %, and cerium oxide is present over a range from greater than 0 molar % up to less than 10 molar %. Resistivity over a range from about $10^9$ to about $10^{11}$ $\Omega \cdot cm$ is also expected to be obtained from a combination of precursor oxides where yttrium oxide is present over a range from more than 0 molar % to less than 100 mole %, and hafnium oxide is present over a range from more than 0 molar % up to less than 100 molar %. Sintered ceramic exhibiting a resistivity over a range of about $10^9$ to about $10^1$ $\Omega \cdot cm$ is also expected to be obtained from a combination of precursor oxides where yttrium oxide is present over a range from about 48 molar % to less than 100 mole %, and niobium oxide is present over a range from greater than 0% up to about 52 molar %.

By way of example, and not by way of limitation, with respect to sintered ceramics which make use of more than two precursor oxides, in one embodiment, a sintered ceramic will exhibit a resistivity over a range of about $10^7$ to about $10^{15}$ $\Omega \cdot cm$ when the sintered ceramic comprises a solid solution, and where the sintered ceramic material is formed from oxides where: yttrium oxide is present over a range from about 40 molar % to less than 100 molar %; zirconium oxide is present over a range from more than 0 molar % to about 50 molar %; and, scandium oxide is present over a range from more than about 0 molar % up to less than 100 molar %.

In another embodiment, a sintered ceramic will exhibit an electrical resistivity over a range of about $10^7$ to about $10^{15}$ $\Omega \cdot cm$ when the sintered ceramic comprises a solid solution, and the sintered ceramic material is fabricated from oxides where: yttrium oxide is present over a range from about 40 molar % to less than 10 molar %; zirconium oxide is present over a range from more than 0 molar % to about 50 molar %, and hafnium oxide is present over a range from more than about 0 molar % up to less than 100 molar %.

In yet another embodiment, a sintered ceramic will exhibit a resistivity over a range of about $10^7$ to about $10^{15}$ $\Omega \cdot cm$ when the sintered ceramic comprises a solid solution, and the sintered ceramic material is fabricated from oxides where: yttrium oxide is present over a range from about 40 molar % to less than 100 molar %; zirconium oxide is present over a range from more than 0 molar % to about 45 molar %; and, niobium oxide is present over a range from more than about 0 molar % up to about 80 molar %.

In one embodiment, the sintered ceramic material contains three phases, which include: a first phase solid solution comprising $Y_2O_3$—$ZrO_2$—$Nb_2O_5$ which makes up from about 60 molar % to about 90 molar % of the sintered ceramic material; a second phase of $Y_3NbO_7$ which makes up from about 5 molar % to about 30 molar % of the sintered ceramic material; and, a third phase of Nb in elemental form, which makes up from about 1 molar % to about 10 molar % of the sintered ceramic material.

In another embodiment of the sintered ceramic material which contains three phases, yttrium oxide is present over a range from about 60 molar % to about 75 molar %; zirconium oxide is present over a range from about 15 molar % to about 25 molar %, and niobium oxide is present over a range from about 5 molar % to about 15 molar %.

In sintered ceramic test specimens formed from a $Y_2O_3$—$ZrO_2$-$M_xO_y$ material of the kind described above, in embodiments where M is scandium, hafnium, niobium, or neodymium, an erosion rate was demonstrated which was 0.16 μm/hour or less, after exposure for 76 hours to a $CF_4$/$CHF_3$ plasma. A similar erosion rate is expected when M is cerium, samarium, erbium, or another lanthanide series element. The plasma was formed in an Enabler for Trench Etch plasma processing chamber available from Applied Materials, Inc. The plasma source power was up to 2000 W, the process chamber pressure was 10-500 mTorr, and the substrate temperature was 40° C. This erosion rate of 0.16 μm/hour or less is equivalent to the erosion rate of pure $Y_2O_3$. Thus, the erosion rate of the sintered ceramics has been unaffected by the modification of the sintered ceramic to provide a lower resistivity sintered ceramic.

While the ceramic materials described above were sintered ceramics formed from oxides using sintering techniques known in the art, in other embodiments, the starting material compositions listed above may be used to form a ceramic coating over the surface of a variety of metal and ceramic substrates, including, but not limited to, aluminum, aluminum alloy, stainless steel, alumina, aluminum nitride and quartz, using a coating technique. Such coating techniques include plasma spraying, thermal/flame spraying; physical vapor deposition from a sputtering target which is formed by sintering the oxides; or, chemical vapor deposition, by way of example and not by way of limitation.

BRIEF DESCRIPTION OF THE DRAWINGS

To assist in the understanding of the above recited embodiments, a more particular description of specific embodiments described above may be had by reference to the appended drawings. It is to be noted, however, that the appended drawings illustrate only a portion of the typical embodiments, and are not therefore considered to be limiting in scope of the invention which is described herein. The invention includes other equally effective embodiments.

FIG. 2 is a phase diagram 200 of $Y_2O_3$—$ZrO_2$—$Al_2O_3$. This phase diagram shows, among other compositions, the composition of a specialized material, identified herein as an area "A" on the phase diagram, for reference purposes. The type "A" ceramic material is a ceramic composition which has demonstrated excellent resistance to erosion by halogen plasmas.

FIG. 3 is a phase diagram 300 of $Y_2O_3$—$ZrO_2$—$Nb_2O_5$. This phase diagram shows, among other compositions, the composition of a specialized material, identified herein as an area "B" on the phase diagram, for reference purposes. The type "B" ceramic material is a ceramic composition which not only resists erosion by halogen plasmas, but which also exhibits a controlled, lower electrical resistivity than the type "A" ceramic material, for example.

DETAILED DESCRIPTION OF EXEMPLARY EMBODIMENTS

As a preface to the detailed description, it should be noted that, as used in this specification and the appended claims, the singular forms "a", "an", and "the" include plural referents, unless the context clearly dictates otherwise.

When the word "about" is used herein, this is intended to mean that the nominal value presented is precise within ±10%.

Described herein are specialized ceramic materials which are developed to resist corrosion under semiconductor device processing conditions which employ a halogen-containing plasma. In certain embodiments, the specialty materials have been modified to have a reduced electrical resistivity when compared with similar ceramic materials which were developed previously to provide plasma erosion resistance. The reduced electrical resistivity is helpful in reducing the possibility of plasma arcing at various components within a semiconductor processing chamber, most notably upon a surface of an electrostatic chuck or a substrate lift pin, where plasma arcing is more of a problem, for example and not by way of limitation. In the past the component, or at least the surface of the component was fabricated from aluminum nitride or aluminum oxide, which might be doped to provide electrical properties. While this material provided the desired electrical properties, the corrosion/erosion rate was relatively rapid, limiting the useful lifetime of the particular component, and requiring more down time for repairs and replacement of component parts.

Further, the electrical properties of the various materials used as process chamber liners and functional components within a plasma processing semiconductor apparatus affect the behavior of the plasma. Changes in the behavior of the plasma affect the plasma processing characteristics, and when the effect is substantial, it is necessary to change other process variables to accommodate the change in the plasma behavior. Rather than rework processing variables for device fabrication, it is more practical to develop erosion resistant ceramic materials which have acceptable electrical properties. Only a portion of the ceramic materials which exhibit acceptable plasma corrosion/erosion characteristics can be modified to control electrical resistivity properties within the desired range useful for a component in contact with plasmas. One skilled in the art and having read the present description will be able to be relatively certain of success when selecting combinations of oxides to form the ceramic materials.

For reasons of convenience, the development of acceptable halogen plasma corrosion/erosion-resistant ceramic materials having the desired electrical properties was carried out by making use of sintered ceramics. The sintered ceramics were produced by techniques well known in the art. In other embodiments, acceptable halogen plasma corrosion/erosion-resistant ceramic materials of the same general composition may be applied as a coating over an underlying material, such as aluminum or aluminum alloy, for example, using thermal/flame spraying or plasma spraying. In the alternative, a sintered ceramic material may be used to fabricate a target which may be used to apply the ceramic material by physical vapor deposition over the underlying material, particularly when the apparatus over which the protective ceramic material is to be applied is large, such as a process chamber liner.

As previously discussed, the sintered ceramic materials of interest comprise yttrium oxide. The resistivity of the sintered, yttrium-comprising ceramic material may be altered. In one exemplary technique, at least one other oxide is added to the yttrium oxide and the mixture is sintered. The positive ions of the at least one other oxide have a different valence from the $Y^{3+}$ ion, to form a Y vacancy, leading to a decrease of electrical resistivity. Examples of such oxides include $CeO_2$, $TiO_2$, $ZrO_2$, $HfO_2$, and $Nb_2O_5$, by way of example and not by way of limitation. In another exemplary technique, the at least one other oxide is added to yttrium oxide, and the mixture is sintered in a reductive atmosphere; however, the positive ions of the at least one other oxide show the same valence as the $Y^{3+}$ ion, but possess a significantly different ion radius than the $Y^{3+}$ ion. This results in an O vacancy, which also decreases electrical resistivity. Examples of oxides which show the same valence as the $Y^{3+}$ ion, but possess a significantly different ion radius include $Nd_2O_3$, $Sm_2O_3$, $Sc_2O_3$, $Yb_2O_3$, $Er_2O_3$, $Ho_2O_3$ and $Dy_2O_3$, by way of example and not by way of limitation.

A number of exemplary sintered ceramic materials have been investigated to date, and the TABLE below provides an illustration of a portion of the sintered ceramic materials which were created and evaluated. The evaluation of these materials is discussed subsequently.

EXAMPLES

TABLE

| Sample # | Precursor Molar % | Precursor Weight % | Precursor Weight Parts/100 $Y_2O_3$ | Melting Point (° C.) | Sintering Temp. (° C.) | Phase Comp. | Density (g/cm$^3$) |
|---|---|---|---|---|---|---|---|
| 1 | $Y_2O_3$: 75.0<br>$HfO_2$: 20.0<br>$ZrO_2$: 5.0 | $Y_2O_3$: 77.82<br>$HfO_2$: 19.35<br>$ZrO_2$: 2.83 | $Y_2O_3$: 100.00<br>$HfO_2$: 24.86<br>$ZrO_2$: 3.64 | 2800 | >1800 | c-ss single phase** | 5.607 |
| 2 | $Y_2O_3$: 60.0<br>$Sc_2O_3$: 20.0<br>$ZrO_2$: 20.0 | $Y_2O_3$: 72.18<br>$Sc_2O_3$: 14.69<br>$ZrO_2$: 13.13 | $Y_2O_3$: 100.00<br>$Sc_2O_3$: 20.36<br>$ZrO_2$: 18.19 | 2360 | >1800 | c-ss single phase** | 4.936 |
| 3 | $Y_2O_3$: 60.0<br>$Nd_2O_3$: 20.0<br>$ZrO_2$: 20.0 | $Y_2O_3$: 59.58<br>$Nd_2O_3$: 29.58<br>$ZrO_2$: 10.84 | $Y_2O_3$: 100.00<br>$Nd_2O_3$: 49.66<br>$ZrO_2$: 18.19 | N/A* | >1800 | c-ss single phase** | 5.555 |
| 4 | $Y_2O_3$: 70.0<br>$Nb_2O_5$: 10.0<br>$ZrO_2$: 20.0 | $Y_2O_3$: 75.53<br>$Nb_2O_5$: 12.7<br>$ZrO_2$: 11.77 | $Y_2O_3$: 100.00<br>$Nb_2O_5$: 16.82<br>$ZrO_2$: 15.59 | N/A* | >1800 | c-ss** $Y_3NbO$ and Nb | 5.331 |

*N/A = not available
**c-ss means cubic yttria type solid solution.

Example One

Figure 1:
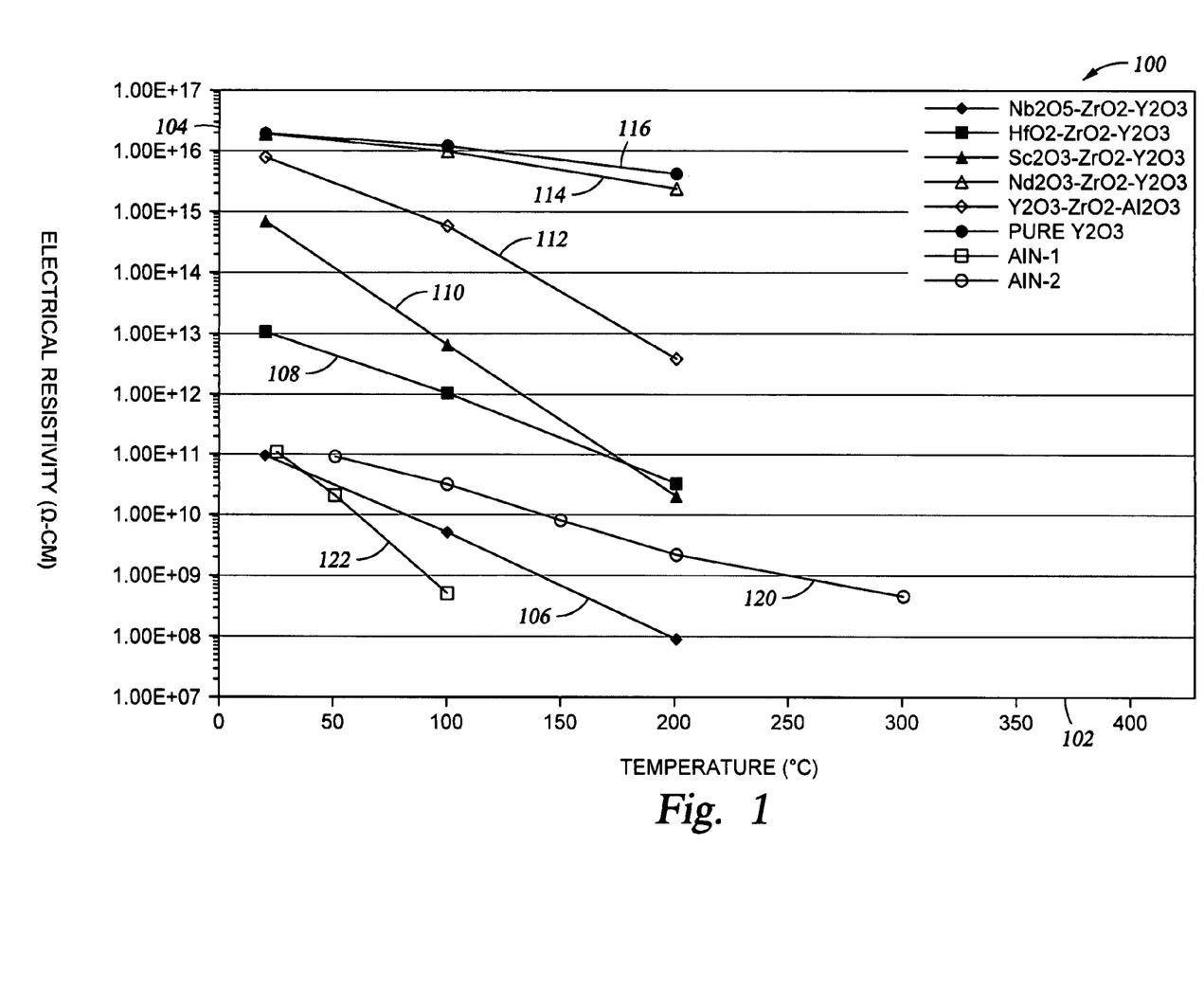
FIG. 1 is a graph 100 illustrating the electrical resistivity, as a function of temperature, for a variety of materials, where the applied voltage was 1000 V in an air environment.

FIG. 1 shows a graph 100 illustrating electrical resistivity of a variety of ceramic materials, including the Type A and Type B materials made according to exemplary embodiments of the invention. The resistivity is shown on axis 104, as a function of temperature, which is shown on axis 102. The resistivity was measured at 1000 V in an air environment, using standard test conditions in accordance with ASTM D 1829-66 or JIS C2141.

Curve 106 shown in FIG. 1 is representative of the $Nb_2O_5$-comprising sintered ceramic material which is described as Sample #4 in the Table. With respect to sintered ceramic material comprising $Nb_2O_5$, acceptable electrical resistivity values are expected to be obtained for additional compositions as well, as illustrated by the phase diagram shown in FIG. 3. The sintered ceramic material contains three phases, which include a first phase solid solution comprising $Y_2O_3$—$ZrO_2$—$Nb_2O_5$ which may make up about 60 molar % to about 90 molar % of the sintered ceramic material; a second phase of $Y_3NbO_7$ which may make up from about 5 molar % to about 30 molar % of the sintered ceramic material; and, a third phase of Nb in elemental form, which may make up from about 1 molar % to about 10 molar % of the sintered ceramic material. This material is particularly useful when the resistivity needs to be low to prevent arcing. The resistivity is lower than about $10^{11}$ Ω·m at room temperature and about $10^8$ Ω·cm at 200° C., and may exhibit a resistivity in the range of $10^9$ Ω·cm at typical semiconductor processing conditions.

Figure 3:
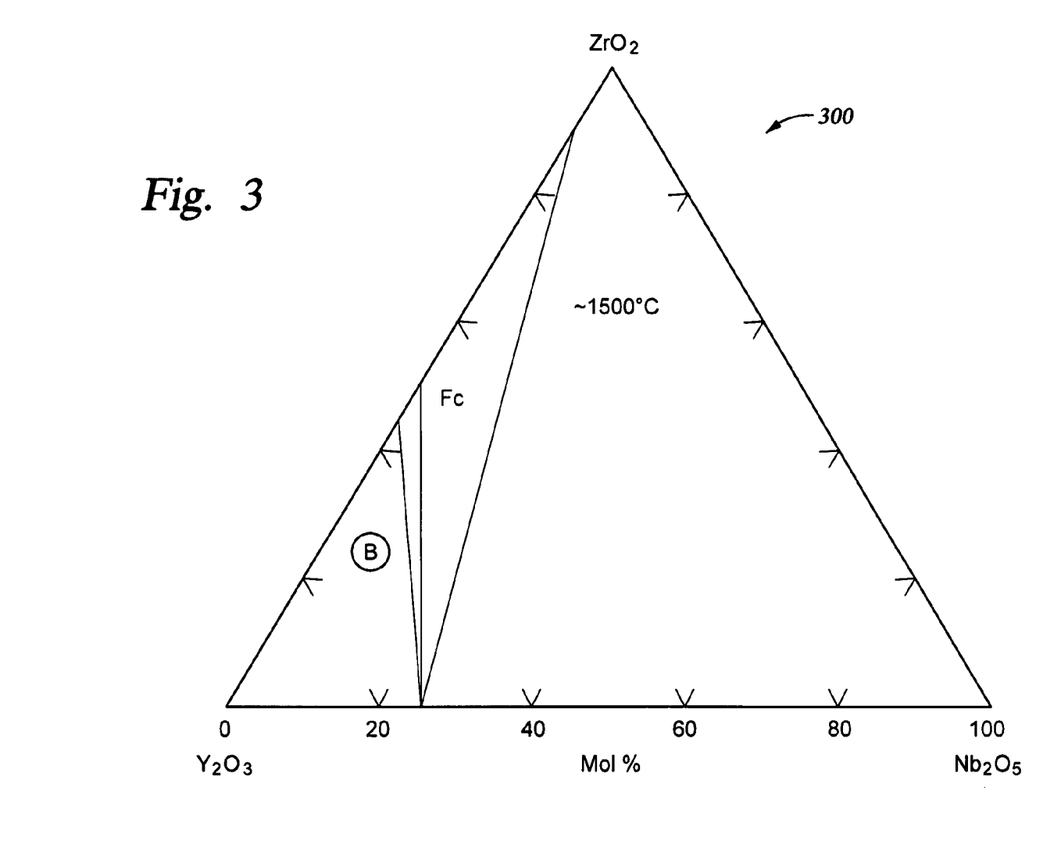

One embodiment of the $Nb_2O_5$-comprising sintered ceramic material illustrated in FIG. 1 is referred to as $Nb_2O_5$—$ZrO_2$—$Y_2O_3$. With reference to FIG. 3, one area of the phase diagram has been labeled as "B". This designation indicates that the solid solution composition of a sintered ceramic material comprises $Y_2O_3$ at a concentration ranging from about 55 molar % to about 80 molar %, $ZrO_2$ at a concentration ranging from about 5 molar % to about 25 molar %, and an additive such as $Nb_2O_5$, $HfO_2$, $Nd_2O_3$, or $Sc_2O_3$ at a concentration ranging from about 5 molar % to about 25 molar %.

Example Two

Curve 108 shown in FIG. 1 is representative of the $HfO_2$-comprising sintered ceramic material, made in accordance with the present invention, which is also described as Sample #1 in the Table. This ceramic material exhibits a higher resistivity than the $Nb_2O_5$-comprising material, but is useful for fabricating semiconductor processing apparatus components where arcing is less critical than with respect to an electrostatic chuck or a substrate lift pin.

Example Three

Curve 110 shown in FIG. 1 is representative of the $Sc_2O_3$-comprising sintered ceramic material, made in accordance with the present invention, which is also described as Sample 2 in the Table. Again, this material may be used in applications where the resistivity requirement is $10^{11}$ Ω·m.

Example Four (Comparative Example)

Figure 2:
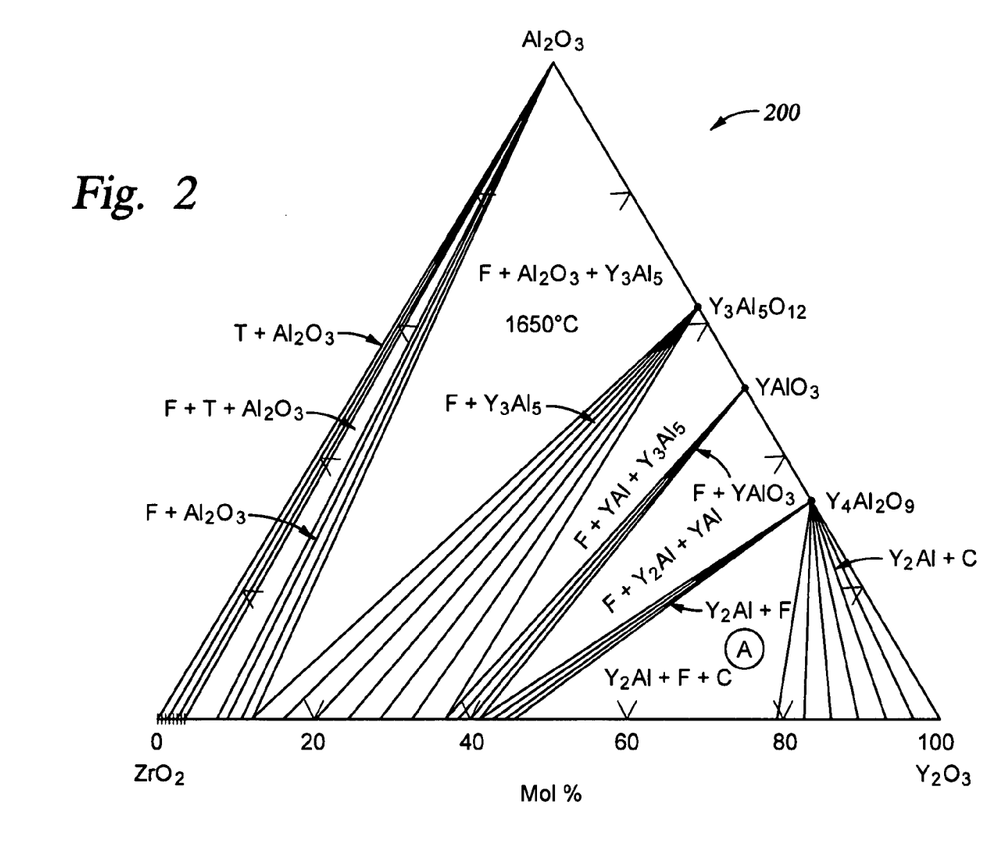

Curve 112 shown in FIG. 1 is representative of the $Y_2O_3$—$ZrO_2$—$Al_2O_3$ material which is illustrated in the FIG. 2 phase diagram. This material is described for purposes of a comparative example only with respect to the controlled resistivity ceramic materials. This sintered ceramic material comprises a solid solution which is formed from $Y_2O_3$ and $ZrO_2$, and a compound which is formed from $Y_2O_3$ and $Al_2O_3$ oxides. A typical sintered ceramic material is formed from $Y_2O_3$ at a concentration ranging from about 60 molar % to about 65 molar %; $ZrO_2$ at a concentration ranging from about 20 molar % to about 25 molar %; and, $Al_2O_3$ at a concentration ranging from about 10 molar % to about 15 molar %. One embodiment of a sintered ceramic material, which is illustrated by area "A" in the phase diagram in FIG. 2, and which is represented by the graph for $Y_2O_3$—$ZrO_2$—$Al_2O_3$ shown in FIG. 1, contains: about 60 molar % solid solution with a cubic yttria type crystal structure, where c-$Y_2O_3$ is a solvent, with $Zr_2O_3$ solute; about 2 molar % solid solution with a fluorite type crystal structure, where $ZrO_2$ is a solvent, with $Y_2O_3$ solute; and about 38 molar % YAM ($Y_4Al_2O_9$) compound.

Example Five (Comparative Example)

Curve 114 of FIG. 1 is representative of the $Nd_2O_3$ -comprising sintered ceramic material which is described as Sample #3 in the Table. This material failed to meet the requirements which are necessary to prevent arcing, and is considered to be a comparative example which is not part of the unique ceramic materials which make up the invention.

Example Six (Comparative Example)

Curve 116 of FIG. 1 is representative of the electrical resistivity characteristics observed for a sintered ceramic of pure $Y_2O_3$. This material is also a comparative example, which is useful as a baseline, since a number of semiconductor apparatus components have been fabricated from pure $Y_2O_3$. A comparison of the resistivity of the pure $Y_2O_3$ shows the very significant improvement in terms of electrical resistivity which is achieved by the present invention.

Also shown in FIG. 1 are curves 120, which represents a doped aluminum nitride of the kind commonly used to fabricate an electrostatic chuck, and 122 which represents a second doped aluminum nitride which is also used to fabricate an electrostatic chuck and other semiconductor processing apparatus which require a low electrical resistivity.

Example Seven

Figure 4:
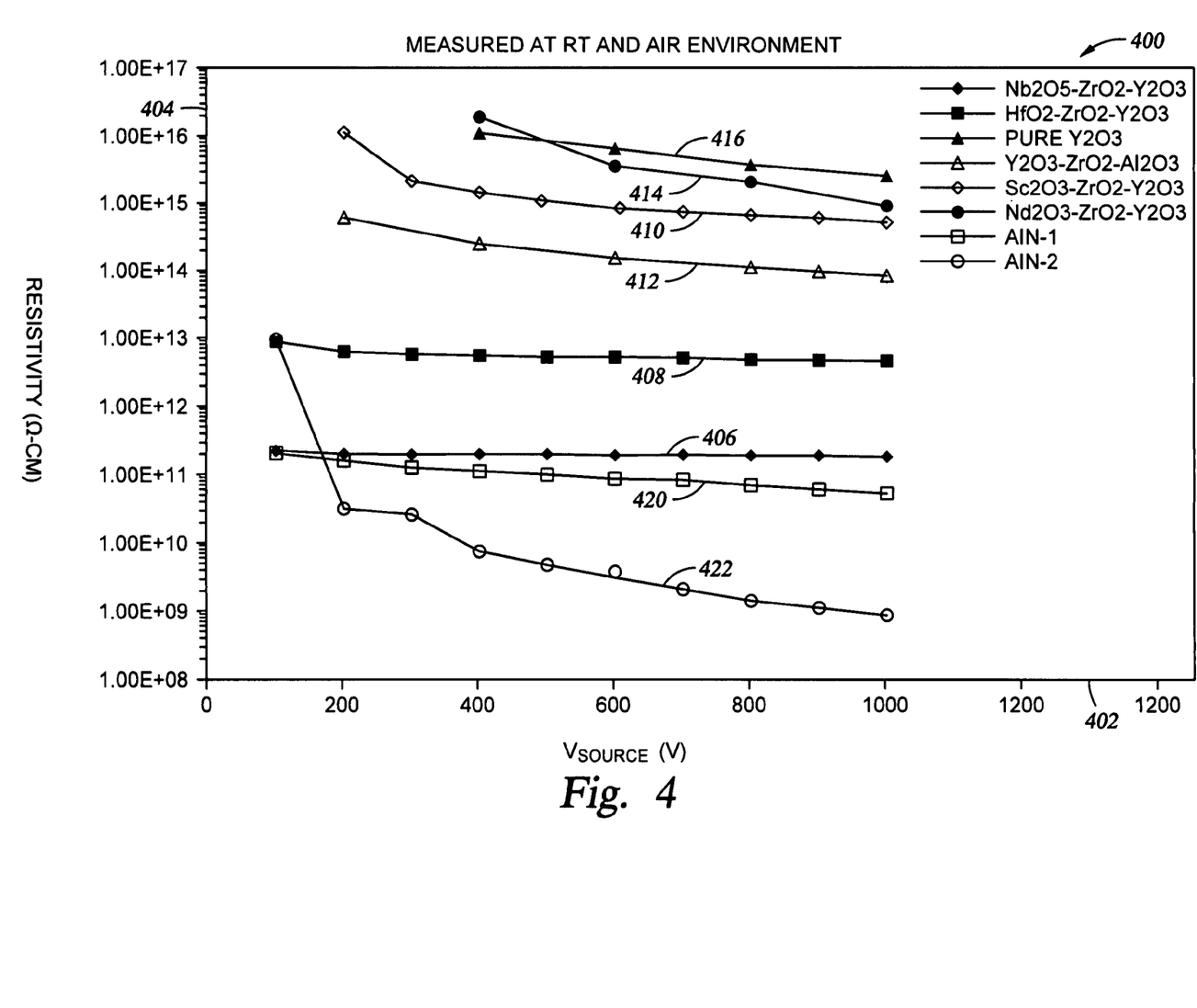
FIG. 4 is a graph 400 illustrating electrical resistivity, as a function of applied voltage, for a variety of materials, where the measurement was made at room temperature (about 27° C.) in an air environment.

FIG. 4 is a graph 400 which illustrates the electrical resistivity, as a function of the voltage applied during the resistivity testing, for a number of sintered ceramic test specimens. The resistivity is shown on axis 404, with the voltage shown on axis 402. The test temperature is room temperature (about 27° C.). The purpose of this graph is to illustrate the differences in resistivity between the corrosion-resistant ceramic embodiments of the present invention which have been controlled to reduce resistivity and the currently used doped aluminum nitride ceramics. While the doped aluminum nitride ceramics have a somewhat lower resistivity, their corrosion rate is at least 2 times higher than that of the yttrium oxide-comprising ceramics which have been modified to reduce resistivity.

In particular, Curve 422 of FIG. 4 represents doped aluminum nitride ceramic of the kind currently used to fabricate an electrostatic chuck. Curve 420 represents another doped aluminum nitride ceramic which is used to fabricate an electrostatic chuck and other low resistivity components.

Curve 406 of FIG. 4 is representative of the $Nb_2O_5$ -comprising sintered ceramic material which is described as Sample #4 in the Table. This yttrium-oxide comprising material which has been modified to reduce resistivity exhibits a resistivity which is very close to that of the doped aluminum nitride identified as AlN-1. Yet, the corrosion rate of the doped aluminum nitride is more than 10 times faster than the corrosion rate of the yttrium-oxide comprising material illustrated by curve 406, as is shown by the bar chart 500 in FIG. 5.

Curve 408 in FIG. 4 is representative of the $HfO_2$ -comprising sintered ceramic material which is described as Sample #1 in the Table. This ceramic material exhibits a higher resistivity than the $Nb_2O_5$ -comprising material, and at room temperature exhibits a resistivity which is outside of the recommended range for components where plasma arcing is more likely to occur. However, at 200° C., a temperature which is present during some semiconductor processing, the resistivity falls within an acceptable range, as illustrated by Curve 108 in FIG. 1.

Curve 410 of FIG. 4 is representative of the $Sc_2O_3$-comprising sintered ceramic material which is described as Sample 2 in the Table. Again, this material may be used in applications where the resistivity requirement is $10^{11}$ Ω·cm, when the processing temperature is 200° C.

For comparative purposes (with respect to a controlled electrical resistivity ceramic containing a yttria-comprising solid solution), Curve 412 of FIG. 4 shows a ceramic type "A" material comprising $Y_2O_3$, $ZrO_2$, and $Al_2O_3$ which is illustrated in FIG. 2. One embodiment of such a type "A" material, which is shown in FIG. 1, contains about 60 molar % cubic yttria type structure with c-$Y_2O_3$ as a solvent and with $Zr_2O_3$ solute; about 2 molar % fluorite-type structure solid solution with $ZrO_2$ as a solvent and with $Y_2O_3$ solute; and, about 38 molar % YAM ($Y_4Al_2O_9$) compound. While the Type A HPM material exhibits acceptable corrosion-resistant properties and commendable mechanical properties, the electrical resistivity is considerably higher that the desired range maximum $10^{11}$ Ω·cm. This is the case even at 200° C., as illustrated by Curve 112 in FIG. 1. This material is not included among the embodiments for the electrical resistivity modified corrosion resistant ceramics.

For comparative purposes, Curve 414 of FIG. 4 shows the $Nd_2O_3$— comprising sintered ceramic material which is described as Sample #3 in the Table. This material failed to meet the requirements which are necessary to prevent arcing, and is considered to be a comparative example which is not part of the unique ceramic materials which make up the invention.

For comparative purposes, Curve 416 of FIG. 4 shows the electrical resistivity characteristics observed for a sintered ceramic of pure $Y_2O_3$. This material is also a comparative example, which is useful as a baseline, since a number of semiconductor apparatus components have been fabricated from pure $Y_2O_3$. A comparison of the resistivity of the pure $Y_2O_3$ shows the very significant improvement in terms of electrical resistivity which is achieved by the present invention.

Example Eight

Figure 5:
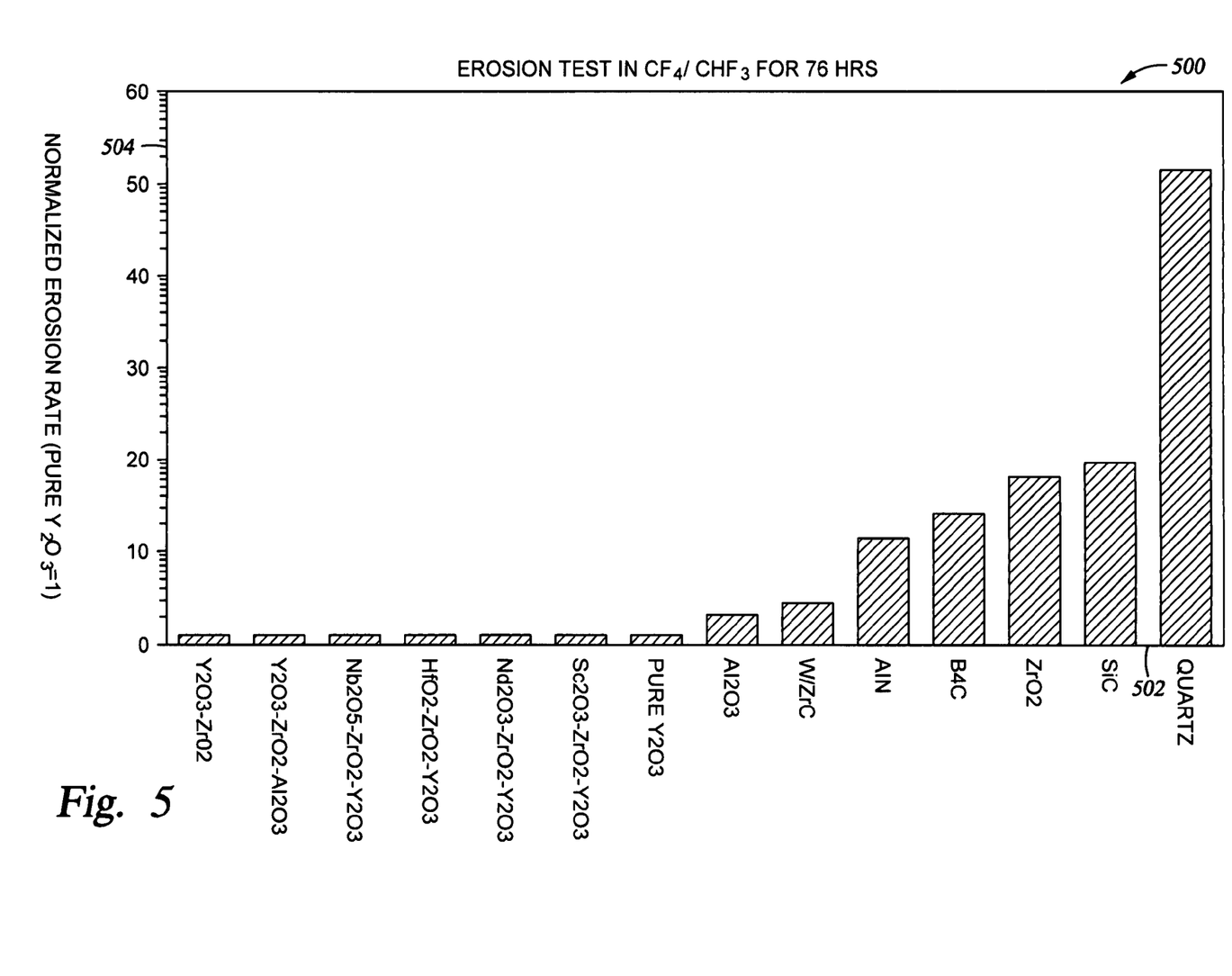
FIG. 5 is a bar chart 500 which shows the average exemplary erosion rate, normalized relative to that for pure yttrium oxide, for a variety of sintered ceramic materials which were exposed to a plasma generated from $CF_4$ and $CHF_3$ source gases.

FIG. 5 illustrates a bar chart 500 which shows the average erosion rate in μm/hr of a variety of sintered ceramic materials exposed to a plasma. The plasma was generated from $CF_4$ and $CHF_3$ source gases. The plasma processing chamber was an Enabler for Trench Etch available from Applied Materials, Inc. The plasma source power was up to 2000 W, the process chamber pressure was 10-500 mTorr, and the substrate temperature was about 40° C., for a time period of 76 hours. The axis 502 shows a variety of materials which were tested for erosion resistance. The test specimen identified by a description Y2O3-10 ZrO2, represents a sintered solid solution ceramic test specimen which was formed by sintering 100 parts by weight Y2O3 in combination with 10 parts by weight of ZrO2. The test specimens identified as containing Nb2O5-, or HfO2-, or Nd2O3-, or Sc2O3- represent the TABLE compositions which are recited as containing each of those materials. A comparison of the erosion rates as shown on axis 504 shows that the erosion rates of the resistivity modified, yttrium oxide-comprising sintered ceramic materials are essentially the same as the erosion rate for pure yttrium oxide. Further, the erosion rates of the resistivity modified, yttrium oxide-comprising sintered ceramics are substantially better than the erosion rate of Al2O3, AlN, $ZrO_2$, Quartz, W/ZrC, B4C and SiC, other ceramic materials which have been used to provide a halogen plasma corrosion- resistant materials for semiconductor processing chamber liners and on semiconductor processing apparatus interior components.

Based on the results obtained during the experimentation which provided the examples described above, and data from other reference sources, calculations have been made which provide estimates of the effect of UV radiation in plasma leakage current. UV radiation in a plasma environment (of the kind used in semiconductor processing) does not have an effect on leakage current of electrical resistivity-modified yttrium oxide-comprising sintered ceramic materials.

An investigation of the effect of 193 nm UV irradiation (which is employed in some semiconductor processing operations) on the leakage current in the $Nb_2O_5$—Type B sintered ceramic material and the $HfO_2$—Type B sintered ceramic material has indicated that the electrical performance of these materials should not be affected by such UV irradiation.

The ceramic-comprising articles which are useful as semiconductor processing apparatus which is in contact with a plasma include a lid, a liner, a nozzle, a gas distribution plate, a shower head, an electrostatic chuck component, a shadow frame, a substrate-holding frame, a processing kit, and a chamber liner, by way of example and not by way of limitation.

The above described exemplary embodiments are not intended to limit the scope of the present invention, as one skilled in the art can, in view of the present disclosure, expand such embodiments to correspond with the subject matter of the invention claimed below.

We claim:

1. A method of reducing plasma arcing within a semiconductor processing chamber while simultaneously providing plasma erosion resistance of plasma processing components to fluorine-containing plasmas, said method comprising: forming at least one surface which is exposed said plasma from a ceramic-comprising material which comprises at least one solid solution, wherein said solid solution is formed from more than two precursor oxides, where a first precursor oxide is yttrium oxide, present at a concentration ranging from about 55 molar % to about 80 molar %, a second precursor oxide is zirconium oxide, present over a range from about 5 molar about % to about 25 molar %, and an additional precursor oxide, hafnium oxide, is present over a range from about 5 molar % up to about 25 molar %, so that an erosion rate at said surface of said article when normalized with respect to a ceramic surface formed from yttrium oxide is about 1 and an electrical resistivity at said surface of said article is in the range of about $10^7$ to $10^{15}$ Ω·cm at a temperature ranging from about 350° C. to room temperature, respectively.

2. A method of reducing plasma arcing within a semiconductor processing chamber while simultaneously providing plasma erosion resistance of plasma processing components to fluorine-containing plasmas, said method comprising: forming at least one surface which is exposed said plasma from a ceramic-comprising material comprising at least one solid solution, wherein said ceramic-comprising material surface comprises a three phase sintered ceramic material which includes a first phase of solid solution comprising $Y_2O_3$—$ZrO_2$—$Nb_2O_5$ which makes up from about 60 molar % to about 90 molar % of the sintered ceramic material; a second phase of $Y_3NbO_7$ which makes up from about 5 molar % to about 30 molar % of the sintered ceramic material; and, a third phase of Nb in elemental form, which makes up from about 1 molar % to about 10 molar % of the sintered ceramic material, so that an erosion rate at said surface of said article when normalized with respect to a ceramic surface formed from yttrium oxide is about 1 and an electrical resistivity at said surface of said article is in the range of about $10^7$ to $10^{15}$ Ω·cm at a temperature ranging from about 350° C. to room temperature, respectively.

3. A method of reducing plasma arcing within a semiconductor processing chamber while simultaneously providing plasma erosion resistance of plasma processing components to fluorine-containing plasmas, said method comprising: forming at least one surface which is exposed said plasma from a ceramic-comprising material which comprises at least one solid solution, wherein said solid solution is formed from more than two precursor oxides, where a first precursor oxide is yttrium oxide, a second precursor oxide is zirconium oxide, and wherein at least one additional precursor oxide is added, wherein said at least one additional precursor oxide is selected from the group consisting of hafnium oxide, scandium oxide, niobium oxide, samarium oxide, ytterbium oxide, erbium oxide, cerium oxide, and combinations thereof, where said oxides are present at relative concentrations, so that an erosion rate at said surface of when normalized with respect to a ceramic surface formed from yttrium oxide is about 1 and an electrical resistivity at said surface of said article is in the range of about $10^7$ to $10^{15}$ Ω·cm at a temperature ranging from about 350° C. to room temperature, respectively, wherein said surface is present on an electrostatic chuck, an electrostatic chuck component, or a substrate lift pin.

4. A method in accordance with claim 3, wherein said surface, is part of a unitary solid sintered ceramic component.

5. A method in accordance with claim 3, wherein said surface is a coating present on an underlying surface of a component substrate.

* * * * *